(12) United States Patent
Shimura

(10) Patent No.: US 8,976,772 B2
(45) Date of Patent: Mar. 10, 2015

(54) WIRELESS COMMUNICATION APPARATUS AND CONTROL METHOD THEREFOR

(71) Applicant: Canon Kabushiki Kaisha, Tokyo (JP)

(72) Inventor: Hajime Shimura, Koshigaya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/294,108

(22) Filed: Jun. 2, 2014

(65) Prior Publication Data

US 2014/0267813 A1 Sep. 18, 2014

Related U.S. Application Data

(63) Continuation of application No. 13/787,489, filed on Mar. 6, 2013, which is a continuation of application No. 13/436,794, filed on Mar. 30, 2012, now Pat. No. 8,547,947, which is a continuation of application No. 12/114,580, filed on May 2, 2008, now Pat. No. 8,175,067.

(30) Foreign Application Priority Data

May 29, 2007 (JP) ................................ 2007-142323

(51) Int. Cl.
*H04W 4/00* (2009.01)
*H04N 1/00* (2006.01)
(Continued)

(52) U.S. Cl.
CPC ........... *H04N 1/00347* (2013.01); *H04W 84/18* (2013.01); *H04W 84/20* (2013.01);
(Continued)

(58) Field of Classification Search
USPC ......... 370/328–329, 331–333, 338, 341, 437, 370/442–444, 461–462, 465; 455/436–444
See application file for complete search history.

(56) References Cited

U.S. PATENT DOCUMENTS

| 6,026,303 A | 2/2000 | Minamisawa |
| 6,445,918 B1 | 9/2002 | Hellander |

(Continued)

FOREIGN PATENT DOCUMENTS

| CN | 1522503 A | 8/2004 |
| CN | 1860769 A | 11/2006 |

(Continued)

OTHER PUBLICATIONS

Japanese Office Action dated May 26, 2014 issued in corresponding Japanese Patent Application No. 2013-221513.

*Primary Examiner* — Kevin Mew
(74) *Attorney, Agent, or Firm* — Fitzpatrick, Cella, Harper & Scinto

(57) ABSTRACT

When a wireless communication network is built in an ad hoc mode, it is possible to appropriately build the wireless communication network regardless of start timings of wireless communication functions of image capturing apparatuses. In order to achieve the object, there is provided the image capturing apparatus which is capable of building a wireless communication network by wirelessly connecting to another image capturing apparatus in an ad hoc mode, and which is capable of switching between a function as a creator and a function as a joiner, including a start unit configured to start as the creator, a unit configured to execute a scan process, and a unit configured to determine based on a result of the scan process whether to function as the creator and to function as the joiner, and to control the image capturing apparatus in accordance with the determination result.

19 Claims, 11 Drawing Sheets

(51) Int. Cl.
*H04W 84/18* (2009.01)
*H04W 84/20* (2009.01)
*H04N 5/232* (2006.01)
*H04W 84/12* (2009.01)
*H04W 8/00* (2009.01)
*H04N 101/00* (2006.01)

(52) U.S. Cl.
CPC .............. *H04N 5/232* (2013.01); *H04W 4/005* (2013.01); *H04W 84/12* (2013.01); *H04N 2201/0039* (2013.01); *H04N 2201/0055* (2013.01); *H04N 2201/0084* (2013.01); *H04W 8/005* (2013.01); *H04N 2101/00* (2013.01)
USPC ............................ 370/338; 370/437; 370/465

(56) References Cited

U.S. PATENT DOCUMENTS

| | | | |
|---|---|---|---|
| 6,842,460 | B1 | 1/2005 | Olkkonen et al. |
| 6,970,434 | B1 | 11/2005 | Mahany et al. |
| 7,315,744 | B2 | 1/2008 | Achour |
| 7,489,669 | B2 * | 2/2009 | Moritomo et al. ............ 370/338 |
| 7,555,299 | B2 | 6/2009 | Soliman |
| 7,580,384 | B2 | 8/2009 | Kubler et al. |
| 7,720,477 | B2 | 5/2010 | Moritomo et al. |
| 7,882,196 | B2 | 2/2011 | Fujii et al. |
| 8,416,752 | B2 * | 4/2013 | Watanabe .................... 370/338 |
| 8,559,344 | B2 * | 10/2013 | Abusch-Magder et al. .. 370/310 |
| 8,611,317 | B2 * | 12/2013 | Banerjea et al. ............. 370/338 |
| 2002/0137518 | A1 | 9/2002 | Achour |
| 2003/0080874 | A1 | 5/2003 | Yumoto et al. |
| 2004/0049524 | A1 | 3/2004 | Toyota et al. |
| 2005/0047383 | A1 | 3/2005 | Yoshida |
| 2005/0130050 | A1 | 6/2005 | Takada et al. |
| 2005/0147060 | A1 | 7/2005 | Buckley |
| 2005/0172321 | A1 | 8/2005 | Kakuda |
| 2005/0243765 | A1 * | 11/2005 | Schrader et al. ............. 370/328 |
| 2006/0067290 | A1 | 3/2006 | Miwa et al. |
| 2006/0206592 | A1 | 9/2006 | Fujii et al. |
| 2007/0091845 | A1 | 4/2007 | Brideglall |
| 2007/0206537 | A1 | 9/2007 | Cam-Winget et al. |
| 2008/0089300 | A1 | 4/2008 | Yee |
| 2008/0126519 | A1 | 5/2008 | Knespel et al. |
| 2008/0214192 | A1 | 9/2008 | Soliman |
| 2008/0244066 | A1 | 10/2008 | Yoshida et al. |
| 2008/0268833 | A1 | 10/2008 | Huang et al. |
| 2008/0273486 | A1 | 11/2008 | Pratt et al. |
| 2009/0022092 | A1 | 1/2009 | MacInnis et al. |
| 2009/0092060 | A1 | 4/2009 | Goto |
| 2009/0092101 | A1 | 4/2009 | Busch et al. |
| 2009/0190553 | A1 | 7/2009 | Masuda et al. |
| 2009/0323644 | A1 | 12/2009 | Yokota |
| 2010/0046478 | A1 | 2/2010 | Odenwalder |
| 2010/0135252 | A1 | 6/2010 | Forte et al. |
| 2010/0182956 | A1 | 7/2010 | Moritomo et al. |
| 2010/0228868 | A1 * | 9/2010 | Sakai ........................... 709/228 |
| 2011/0216753 | A1 * | 9/2011 | Kneckt et al. ................. 370/338 |
| 2011/0222424 | A1 * | 9/2011 | Abhishek et al. ............. 370/252 |
| 2012/0263137 | A1 * | 10/2012 | Walton et al. ................. 370/329 |

FOREIGN PATENT DOCUMENTS

| | | |
|---|---|---|
| CN | 1881917 A | 12/2006 |
| JP | 10-145276 A | 5/1998 |
| JP | 2924828 B2 | 7/1999 |
| JP | 2003-78475 A | 3/2003 |
| JP | 2005-045637 A | 2/2005 |
| JP | 2005-172968 A | 6/2005 |
| JP | 3698711 B1 | 9/2005 |
| JP | 2005-323117 A | 11/2005 |
| JP | 2006-311138 A | 11/2006 |
| JP | 2006-352281 A | 12/2006 |
| WO | 2007/094183 A1 | 8/2007 |

\* cited by examiner

FIG. 1
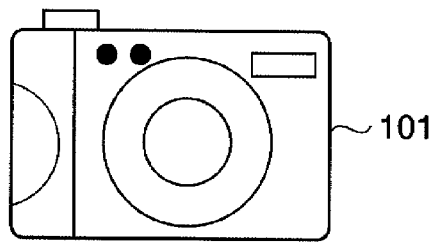
IMAGE CAPTURING APPARATUS
101
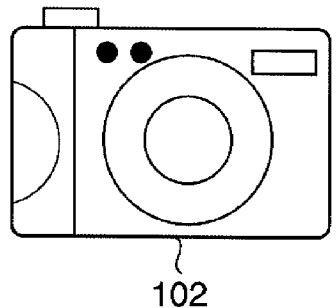
IMAGE CAPTURING APPARATUS
102
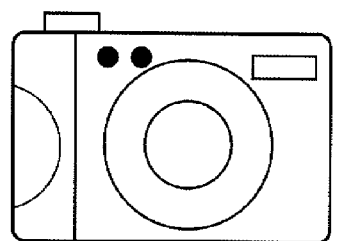
IMAGE CAPTURING APPARATUS
103
100

F I G. 9
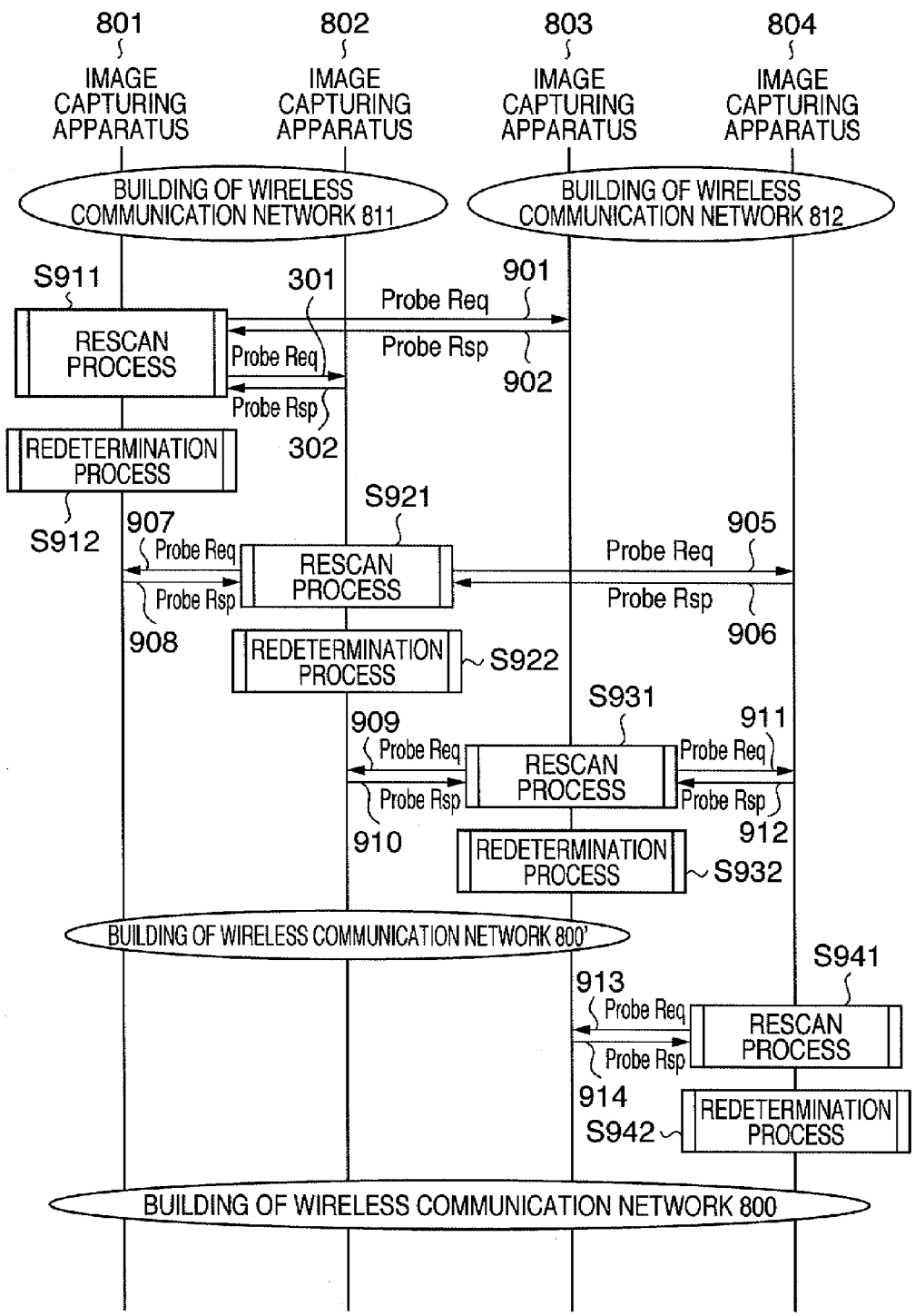

WIRELESS COMMUNICATION APPARATUS AND CONTROL METHOD THEREFOR

This application is a continuation of U.S. application Ser. No. 13/787,489 filed Mar. 6, 2013, which is a continuation of U.S. application Ser. No. 13/436,794, filed Mar. 30, 2012, which is a continuation of U.S. application Ser. No. 12/114,580, filed May 2, 2008, now U.S. Pat. No. 8,175,067, issued May 8,2012, the contents of which are incorporated herein by reference.

BACKGROUND OF THE INVENTION

1. Field of the Invention

The present invention relates to a wireless communication apparatus and a control method therefor and, more particularly, to a communication control technique when a wireless communication network is built in the wireless communication apparatus.

2. Description of the Related Art

In recent years, electronic apparatuses functioning as wireless LAN terminals have appeared. A wireless communication network made up of such electronic apparatuses includes an infrastructure mode network including a base station and wireless LAN terminals existing in the wireless cell of the base station and an ad hoc mode network including only wireless LAN terminals.

In the ad hoc mode network, the electronic apparatuses can directly communicate with each other without any base station. To build a wireless communication network by an electronic apparatus functioning as a wireless LAN terminal, therefore, the ad hoc mode network is expected to be used more and more. (A wireless communication network in an ad hoc mode has been proposed in, e.g., Japanese Patent Nos. 02924828 and 03698711, and Japanese Patent Laid-Open No. 2005-045637.)

The wireless LAN has standards such as IEEE802.11. In the standards, ESSID and BSSID are defined as network identifiers to identify a wireless communication network to be built. ESSID is usually set by a user.

For the standards, in an ad hoc mode, an electronic apparatus, which has built a wireless communication network first, determines a network identifier called BSSID of a wireless communication network. The electronic apparatus executing this operation will be referred to as a creator hereinafter.

The second and subsequent electronic apparatuses search for a beacon of the same ESSID, and operate to participate in the wireless communication network by using BSSID contained in the beacon. The electronic apparatus executing this operation will be referred to as a joiner hereinafter.

In the ad hoc mode, however, if these electronic apparatuses do not appropriately perform procedures for building the wireless communication network and participating in the wireless communication network, the plurality of electronic apparatuses may be creators depending on start timings of the wireless communication functions. In this case, even if the same ESSIDs are set, a plurality of wireless communication networks having different BSSIDs are built.

In the prior art, for example, when the wireless communication function of an electronic apparatus starts, the electronic apparatus executes a scan process for inquiring the presence/absence of a wireless communication network around it. When the electronic apparatus receives, as a result of the scan process, a response message representing that a wireless communication network having the same ESSID exists, the electronic apparatus participates in the wireless communication network already built.

Alternatively, when the electronic apparatus does not receive a response message representing that a wireless communication network exists, the electronic apparatus which has executed the scan process becomes a creator, and builds a wireless communication network.

If, however, a plurality of electronic apparatuses simultaneously start their wireless communication functions, they execute scan processes at the same timing. Each electronic apparatus therefore does not receive, from each of other electronic apparatuses, a response message representing that a wireless communication network exists. In this case, each electronic apparatus cannot recognize the existence of other electronic apparatuses having the same ESSIDs and the electronic apparatuses respectively build wireless communication networks having different ESSIDs.

Consequently, a problem arises in that a plurality of electronic apparatuses which are to communicate with each other cannot participate in the same wireless communication network, and cannot communicate with each other. This will be a big obstacle when the plurality of electronic apparatuses attempt to communicate with each other.

SUMMARY OF THE INVENTION

The present invention has been made in consideration of the above problem, and has as its object to appropriately build a wireless communication network regardless of start timings of wireless communication functions of wireless communication apparatuses when the wireless communication network is built in an ad hoc mode.

A wireless communication apparatus according to the present invention has the following configuration. That is, there is provided a wireless communication apparatus which is capable of building a wireless communication network with another wireless communication apparatus, and which is capable of switching between a function as a control apparatus and a function as a control target apparatus of the wireless communication network, comprising:

a start unit configured to start as the control apparatus;

a transmission unit configured to transmit a search request for searching for another wireless communication apparatus which exists in a communicable range and functions as a control apparatus;

a discrimination unit configured to discriminate on the basis of a response to the search request whether a wireless communication network is built between a plurality of other wireless communication apparatuses;

a determination unit configured to determine on the basis of a discrimination result by the discrimination unit whether to function as the control apparatus or to function as the control target apparatus; and a control unit configured to end the started function as the control apparatus and control to start the function as the control target apparatus when the determination unit determines to function as the control target apparatus, and to control to keep functioning as the control apparatus when the determination unit determines to function as the control apparatus.

Furthermore, a control method for a wireless communication apparatus according to the present invention comprises the following steps. That is, there is provided a control method for a wireless communication apparatus which is capable of building a wireless communication network with another wireless communication apparatus, and which is capable of switching between a function as a control apparatus and a function as a control target apparatus of the wireless communication network, comprising steps of:

starting as the control apparatus;

transmitting a search request for searching for another wireless communication apparatus which exists in a communicable range and functions as a control apparatus;

discriminating on the basis of a response to the search request whether a wireless communication network is built between a plurality of other wireless communication apparatuses;

determining on the basis of a discrimination result in the discriminating step whether to function as the control apparatus or to function as the control target apparatus; and ending the started function as the control apparatus and controlling to start the function as the control target apparatus when it is determined to function as the control target apparatus in the determining step, and controlling to keep functioning as the control apparatus when it is determined to function as the control apparatus in the determining step.

According to the present invention, when a wireless communication network is built in an ad hoc mode, it is possible to appropriately build the wireless communication network regardless of start timings of wireless communication functions of wireless communication apparatuses.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a view showing a wireless communication network 100 including image capturing apparatuses 101 to 103 each having a wireless communication function according to the first embodiment of the present invention;

FIG. 9 is a sequence chart showing processing in a wireless communication controller 212 of each of the image capturing apparatuses 801 to 804;

DESCRIPTION OF THE EMBODIMENTS

Preferred embodiments of the present invention will now be described in detail in accordance with the accompanying drawings.

[First Embodiment]
<1. Configuration of Wireless Communication Network>

FIG. 1 is a view showing the configuration of a wireless communication network 100 built by image capturing apparatuses each having a wireless communication function according to the first embodiment of the present invention. In this embodiment, assume that the wireless communication network 100 is made up from image capturing apparatuses 101, 102, and 103.

Assume also that each of the image capturing apparatuses 101 to 103 has a wireless communication function complying with the IEEE802.11 standard. The image capturing apparatuses 101 to 103 are directly wirelessly connected to each other by wireless communication in an ad hoc mode. Each of the image capturing apparatuses 101 to 103 can transmit images captured in it to other image capturing apparatuses, and receive images captured in other image capturing apparatuses. A wireless LAN communication scheme in the electronic apparatus according to the present invention is not limited to this, and may be another similar communication scheme.

According to the wireless communication function of each of the image capturing apparatuses 101 to 103, when a wireless communication network is built between two of the image capturing apparatuses (wireless communication apparatuses), one apparatus makes a code representing this situation contain in a response message to a scan process of the other apparatus and then transmits it.

More specifically, the code is input to "Vender Specific Information Element" of a "probe response (Probe Rsp)" as the response message to the scan process of the other image capturing apparatus. The code representing that the wireless communication network has been built is referred to as a "network code" hereinafter.

<2. Configuration of Image Capturing Apparatus>

Figure 2:
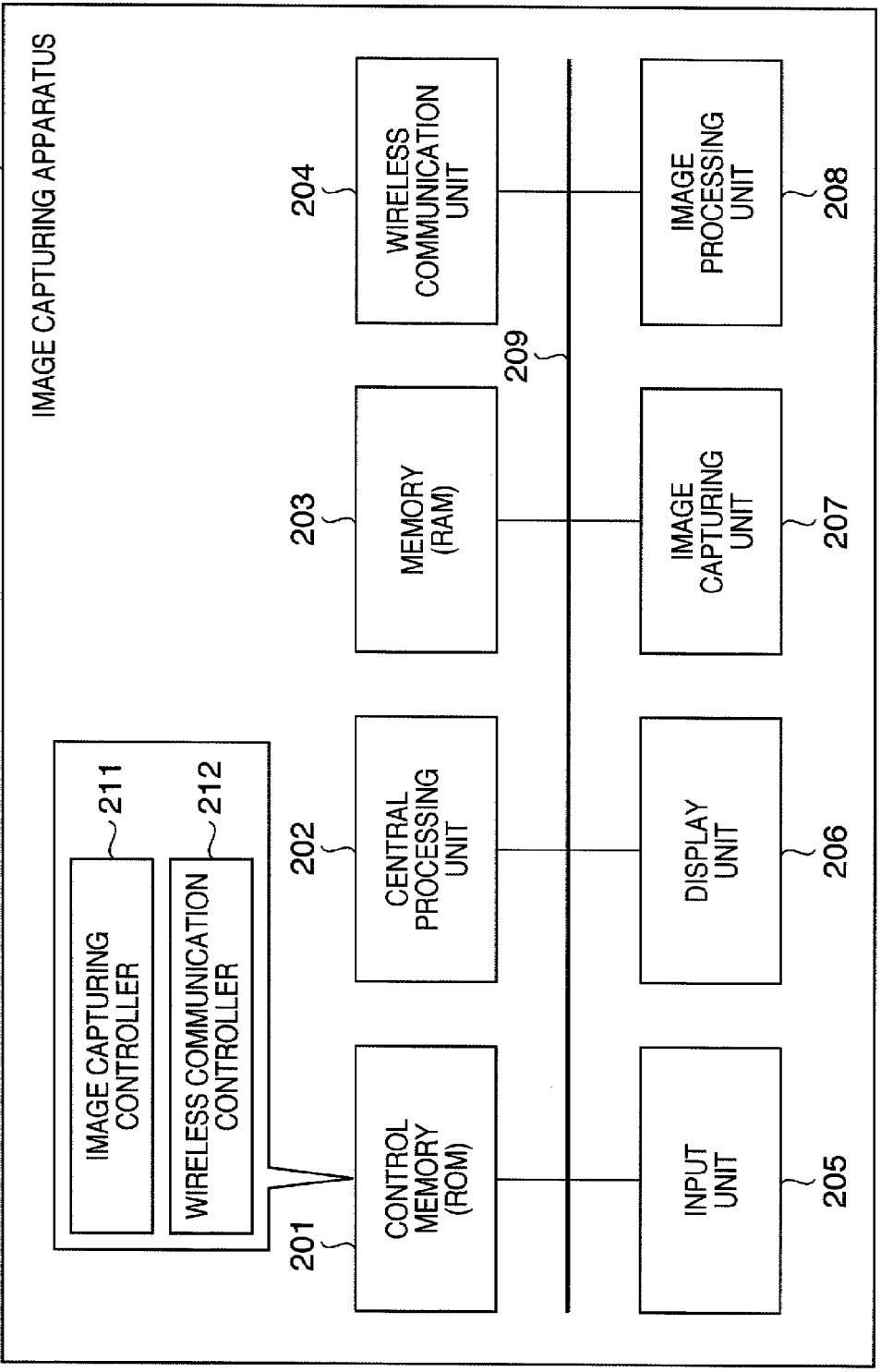
FIG. 2 is a block diagram showing the functional configuration of each of the image capturing apparatuses 101 to 103.

FIG. 2 is a block diagram showing the functional configuration of the image capturing apparatus 101, 102 or 103 having the wireless communication function according to the first embodiment of the present invention. Reference numeral 201 denotes a control memory (ROM); 202, a central processing unit; 203, a memory (RAM); 204, a wireless communication unit; 205, an input unit; 206, a display unit; 207, an image capturing unit; 208, an image processing unit; and 209, a bus.

The image capturing apparatus according to the first embodiment comprises an image capturing function and the wireless communication function. The control memory 201 stores control programs (an image capturing controller 211 and a wireless communication controller 212) for implementing the functions and data (not shown) used in the control programs.

The control programs and data are appropriately loaded to the memory 203 through the bus 209 under the control of the central processing unit 202. The central processing unit 202 executes the processing.

With this operation, the units such as the image capturing unit 207, image processing unit 208, and wireless communication unit 204 operate to implement the image capturing and wireless communication functions. The processing by the image capturing controller 211 and wireless communication controller 212 starts when a user inputs an instruction via the input unit 205. The processing result is displayed on the display unit 206.

<3. Processing sequence for Building Wireless Communication Network 100>

Assume that the wireless communication network 100 is built by the wireless communication function of each of the image capturing apparatuses 101 to 103. A processing sequence of the corresponding wireless communication controller 212 in this case will be described using FIGS. 3 to 5.

Figure 3:
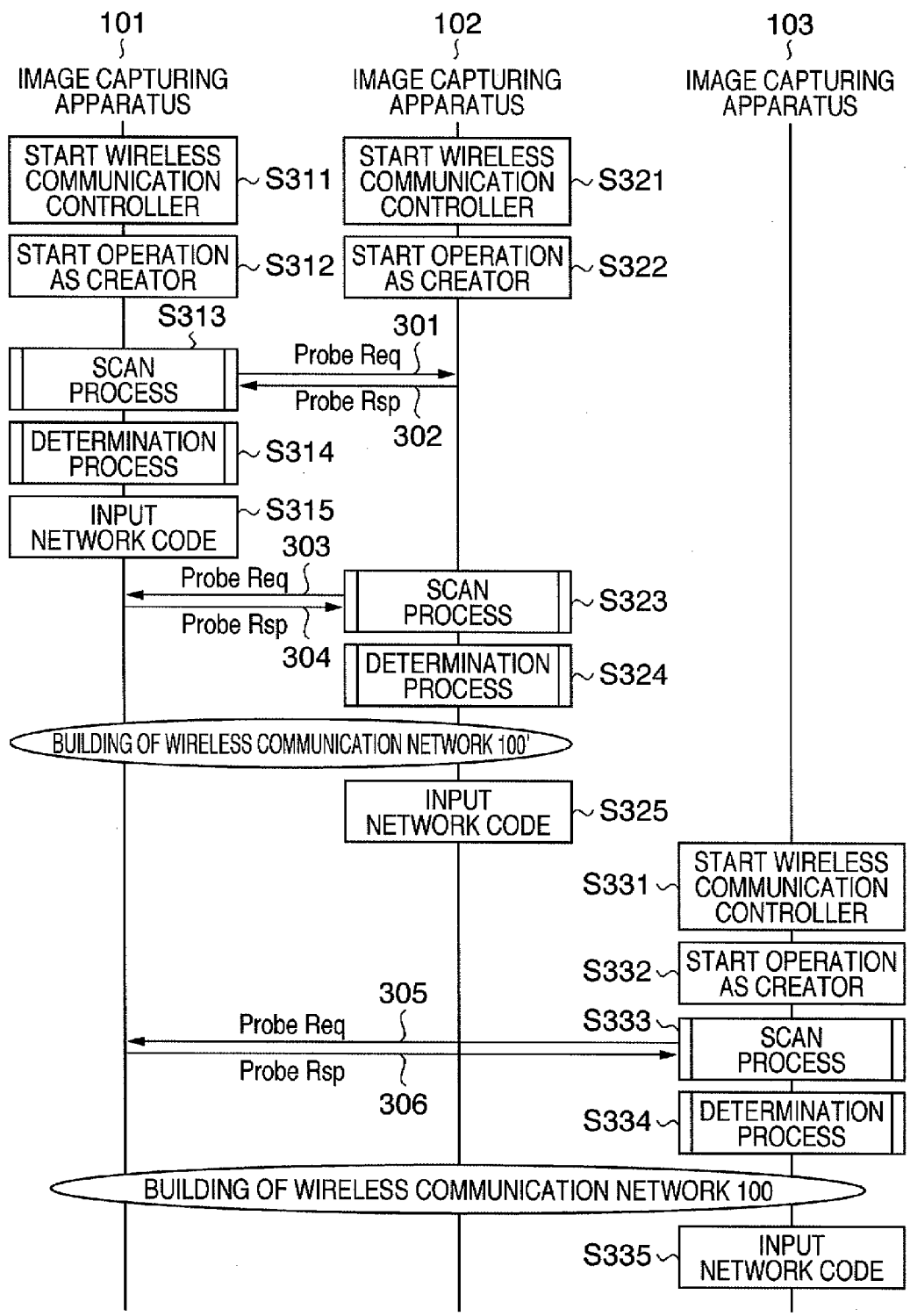
FIG. 3 is a sequence chart showing processing in a wireless communication controller 212 of each of the image capturing apparatuses 101 to 103.
Figure 4:
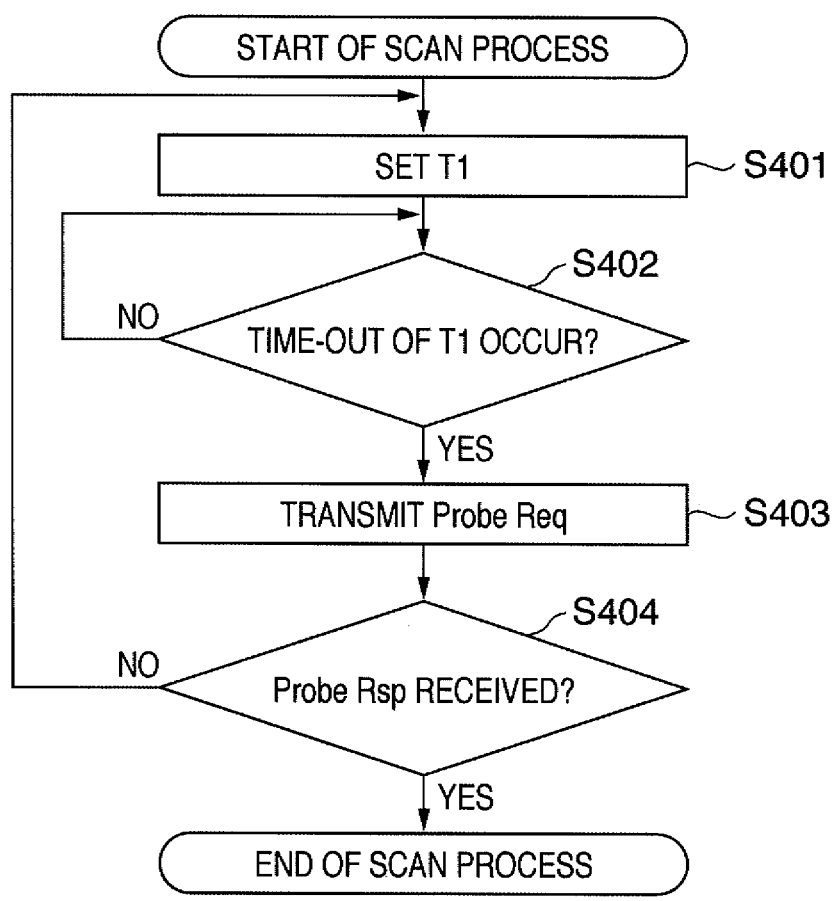
FIG. 4 is a flowchart showing the detailed sequence of a scan process in the sequence chart of FIG. 3.
Figure 5:
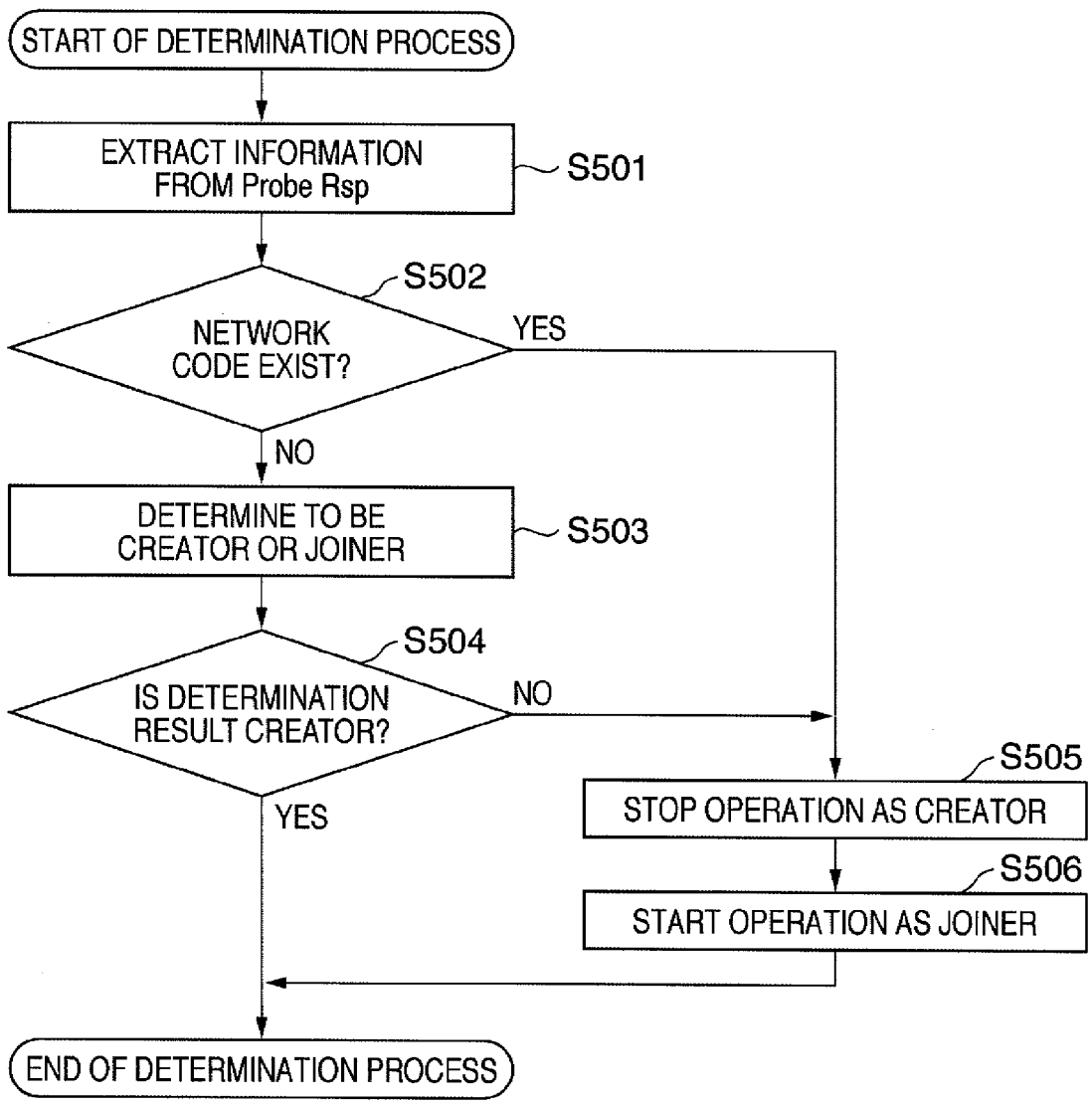
FIG. 5 is a flowchart showing the detailed sequence of a determination process in the sequence chart of FIG. 3.

FIG. 3 is a sequence chart showing processing in the wireless communication controller 212 of each of the image capturing apparatuses 101 to 103. FIGS. 4 and 5 are flowcharts respectively showing detailed sequences of scan and determination processes in the sequence chart (FIG. 3). Assume that identical ESSIDs are set in the image capturing apparatuses 101 to 103.

As shown in FIG. 3, in this embodiment, the wireless communication controllers 212 of the image capturing apparatuses 101 and 102 start at the same time (steps S311 and S321).

When the wireless communication controllers 212 of the image capturing apparatuses 101 and 102 start, the image capturing apparatuses 101 and 102 operate to serve as creators (control apparatuses) to build wireless communication networks (steps S312 and S322). In this way, when the image capturing apparatus serves as a creator to start operation without performing a scan process simultaneously with the start of the wireless communication controller 212, it is possible to shorten the start time.

In step S313, the wireless communication controller 212 of the image capturing apparatus 101 executes a scan process via the wireless communication unit 204, discriminates the presence/absence of a wireless communication network built around the image capturing apparatus 101 (in a communicable range of the image capturing apparatus 101), and obtains the discrimination result.

FIG. 4 is a flowchart showing the detailed sequence of the scan process. The scan process shown in FIG. 4 is common to steps S313, S323, and S333 executed by the image capturing apparatuses 101 to 103 respectively. The scan process (step S313) by the image capturing apparatus 101 will be described here.

In step S401, a probe request random timer T1 is set. In step S402, the image capturing apparatus 101 waits for a time-out of T1. When the time-out of T1 occurs in step S402, the image capturing apparatus 101 transmits a probe request (Probe Req) (a search request) 301 to the image capturing apparatus 102 in step S403.

At this time, the image capturing apparatus 102 has already operated as a creator. The image capturing apparatus 102 informs the image capturing apparatus 101 of the presence of the apparatus 102 by transmitting a probe response (Probe Rsp) 302.

It is determined in step S404 whether the image capturing apparatus 101 receives the probe response 302 to the probe request 301 from the image capturing apparatus 102. If it is determined in step S404 that the image capturing apparatus 101 does not receive the probe response 302, the process returns to step S401 to repeat the above processing.

Alternatively, if it is determined in step S404 that the image capturing apparatus 101 receives the probe response 302, the scan process (step S313) ends.

Referring back to FIG. 3, when the scan process (step S313) ends, a determination process will be executed based on the received probe response 302 in step S314.

FIG. 5 is a flowchart showing a detailed sequence of the determination process (step S314). The determination process shown in FIG. 5 is common to steps S314, S324, and S334 executed by the image capturing apparatuses 101 to 103 respectively. The determination process (step S314) of the image capturing apparatus 101 will be described here.

In step S501, the image capturing apparatus 101 acquires BSSID, Time Stamp, and Capability Information of the image capturing apparatus 102 from the probe response 302.

It is determined in step S502 whether a network code is input to the received probe response 302. If it is determined in step S502 that the network code is not input, it is determined that a wireless communication network is not built and the process advances to step S503. In step S503, the image capturing apparatus 101 is determined to operate as a creator or a joiner (control target apparatus).

If, for example, the determination in step S503 is made based on BSSIDs, BSSID of the image capturing apparatus 101 is compared with that of the image capturing apparatus 102. The image capturing apparatus having a larger BSSID is determined to be a creator and the image capturing apparatus having smaller BSSID is determined to be a joiner, or vice versa.

The determination method in step S503 is not limited to this. It may be determined to be a creator or a joiner by performing the same comparison using information, other than BSSID, acquired from the probe response.

On the other hand, if it is determined in step S502 that the network code is input, it is determined that a wireless communication network has already been built. The process advances to step S505 to stop the operation as a creator.

In this embodiment, two or more image capturing apparatuses do not build a wireless communication network at this stage (in step S314). A network code therefore is not input to Vender Specific Information Element. The image capturing apparatus 101 determines "No" in step S502 and the process does not advance to step S505.

When the image capturing apparatus 101 determines to be a creator in step S503, the determination process ends after step S504. Alternatively, when the image capturing apparatus 101 determines not to be a creator in step S503, the process advances to step S505 to stop the operation as a creator. Furthermore, operation as a joiner starts in step S506 (the image capturing apparatus 101 switches from the creator to the joiner).

In this embodiment, the image capturing apparatus 101 operates as a creator. The image capturing apparatus 101 therefore determines "Yes" in step S504 and the determination process ends after step S504.

Referring back to FIG. 3, when the determination process in step S314 ends, the image capturing apparatus 101 inputs a network code to Vender Specific Information Element in step S315.

On the other hand, the wireless communication controller 212 of the image capturing apparatus 102 starts (step S321) and the image capturing apparatus 102 starts operation as a creator (step S322). The image capturing apparatus 102 then executes the scan process in step S323. The details of the scan process (step S323) have already been described using FIG. 4, and a description thereof will be omitted.

The determination process is executed in step S324. The details of the determination process (step S324) have already been described using FIG. 5, and a description thereof will be omitted. Unlike the determination process (step S314) by the image capturing apparatus 101, however, the image capturing apparatus 101 have already input the network code to Vender Specific Information Element in step S315. The network code has been input to a Vender Specific Information Element extracted from a probe response 304 in step S501.

In case of the image capturing apparatus 102, it is determined in step S502 of FIG. 5 that the network code exists. The image capturing apparatus 102 stops the operation as a creator in step S505, and starts operation as a joiner in step S506.

Referring back to FIG. 3, when the determination process (step S314) of the image capturing apparatus 101 and that (step S324) of the image capturing apparatus 102 are complete, a wireless communication network 100' is built between the image capturing apparatuses 101 and 102.

The image capturing apparatus 102 inputs the network code to the Vender Specific Information Element in step S325.

The processing of the image capturing apparatus 103 will be described next. Assume that the wireless communication controller 212 of the image capturing apparatus 103 starts (step S331) after the wireless communication network 100' is built between the image capturing apparatuses 101 and 102.

When the wireless communication controller 212 of the image capturing apparatus 103 starts, the image capturing apparatus 103 operates to serve as a creator to build a wireless communication network (step S332). In this way, when the image capturing apparatus becomes a creator to start operation without performing a scan process simultaneously with the start of the wireless communication controller 212, it is possible to shorten the start time.

In step S333, the wireless communication controller 212 of the image capturing apparatus 103 executes the scan process via the wireless communication unit 204, and checks the presence/absence of a wireless communication network built around the image capturing apparatus 103. The details of the scan process (step S333) have already been described using FIG. 4, and a description thereof will be omitted.

The determination process is executed in step S334. The details of the determination process (step S334) have already been described using FIG. 5, and a description thereof will be omitted. Unlike the determination process (step S314) by the image capturing apparatus 101, however, the image capturing apparatus 101 has already input the network code to the Vender Specific Information Element in step S315. The network code has been input to Vender Specific Information Element extracted from a probe response 306 in step S501.

In case of the image capturing apparatus 103, it is determined in step S502 of FIG. 5 that the network code exists. The image capturing apparatus 103 stops the operation as a creator in step S505, and starts operation as a joiner in step S506.

Referring back to FIG. 3, when the determination process (step S334) of the image capturing apparatus 103 is complete, the wireless communication network 100 is built between the image capturing apparatuses 101 to 103. That is, the wireless communication network 100 is built between the image capturing apparatuses 101 to 103 when the image capturing apparatus 103 participates, as a joiner, in the wireless communication network 100' built between the image capturing apparatuses 101 and 102.

The image capturing apparatus 103 inputs the network code to the Vender Specific Information Element in step S335.

In an ad hoc mode, when an electronic apparatus newly participates in an existing wireless communication network, the electronic apparatus does not notify existing electronic apparatuses of the participation in the wireless communication network at a wireless LAN layer (PHY layer or MAC layer). The existing electronic apparatuses exchange notification information on the participation in the wireless communication network by using a host application, and then know the electronic apparatuses which are participating in the wireless communication network.

Assume that an electronic apparatus creates a wireless communication network. The electronic apparatus cannot know the existence of electronic apparatuses which newly participate in the network at a wireless LAN layer, and therefore detects the existence of other electronic apparatuses by a host application.

As is apparent from the above explanation, according to this embodiment, when building a wireless communication network in an ad hoc mode, once a wireless communication function of an electronic apparatus starts, the electronic apparatus operates as a creator and executes a scan process. With this operation, the electronic apparatus can acquire information necessary for determining whether to keep operating as a creator or to operate as a joiner.

Consequently, even if wireless communication functions of electronic apparatuses start at the same time, the electronic apparatuses do not build wireless communication networks separately. It is possible to build one wireless communication network in which one electronic apparatus serves as a creator and other electronic apparatuses serve as joiners.

According to this embodiment, an electronic apparatus which has built a wireless communication network transmits a response message containing a network code in response to scan processes of other electronic apparatuses. This makes it possible to cause other electronic apparatuses to operate as joiners.

As described above, according to the embodiment, it is possible to appropriately build a wireless communication network regardless of the start timings of wireless communication functions of electronic apparatuses.

[Second Embodiment]

In the first embodiment mentioned above, a network code is input to the Vender Specific Information Element when the wireless communication network 100' is built between the two image capturing apparatuses 101 and 102. This allows notification of other image capturing apparatuses (the image capturing apparatus 103) that the wireless communication network 100' has been built.

As a result, even if wireless communication controllers of a plurality of image capturing apparatuses start after the wireless communication network 100' is built, the image capturing apparatuses operate to participate in the existing wireless communication network. It is therefore possible to avoid a situation in which a plurality of wireless communication networks are built.

If, however, wireless communication controllers of other image capturing apparatuses start before a wireless communication network is built between two image capturing apparatuses, each of the plurality of image capturing apparatuses transmits a probe response in response to a scan process executed by each image capturing apparatus. Consequently, it may be impossible to appropriately build a wireless communication network because conditions for determining a creator or a joiner in a wireless communication network are different between the image capturing apparatuses.

In this embodiment, an image capturing apparatus will be described, which has a wireless communication function capable of appropriately building a wireless communication network even if wireless communication controllers of other image capturing apparatuses start before a wireless communication network is built between two image capturing apparatuses.

If wireless communication controllers of other image capturing apparatuses start before a wireless communication network is built between two image capturing apparatuses, a problem arises in that each of the plurality of image capturing apparatuses returns a response message when other image capturing apparatuses execute scan processes. When the image capturing apparatus receives a plurality of probe responses, it is impossible to determine one creator if conditions for determining a creator or a joiner are different between the image capturing apparatuses.

In this embodiment, when an image capturing apparatus receives a plurality of probe responses, the image capturing apparatus leaves a wireless communication network. The image capturing apparatus does not respond to the probe requests from the image capturing apparatuses which are building the wireless communication network, and waits for the completion of the wireless communication network building between the image capturing apparatuses. This embodiment will be described in detail below.

<1. Processing Sequence for Building Wireless Communication Network>

Assume that image capturing apparatuses 101 to 103 according to the embodiment build a wireless communication network. A processing sequence in this case will be described using FIGS. 6 and 7.

Figure 6:
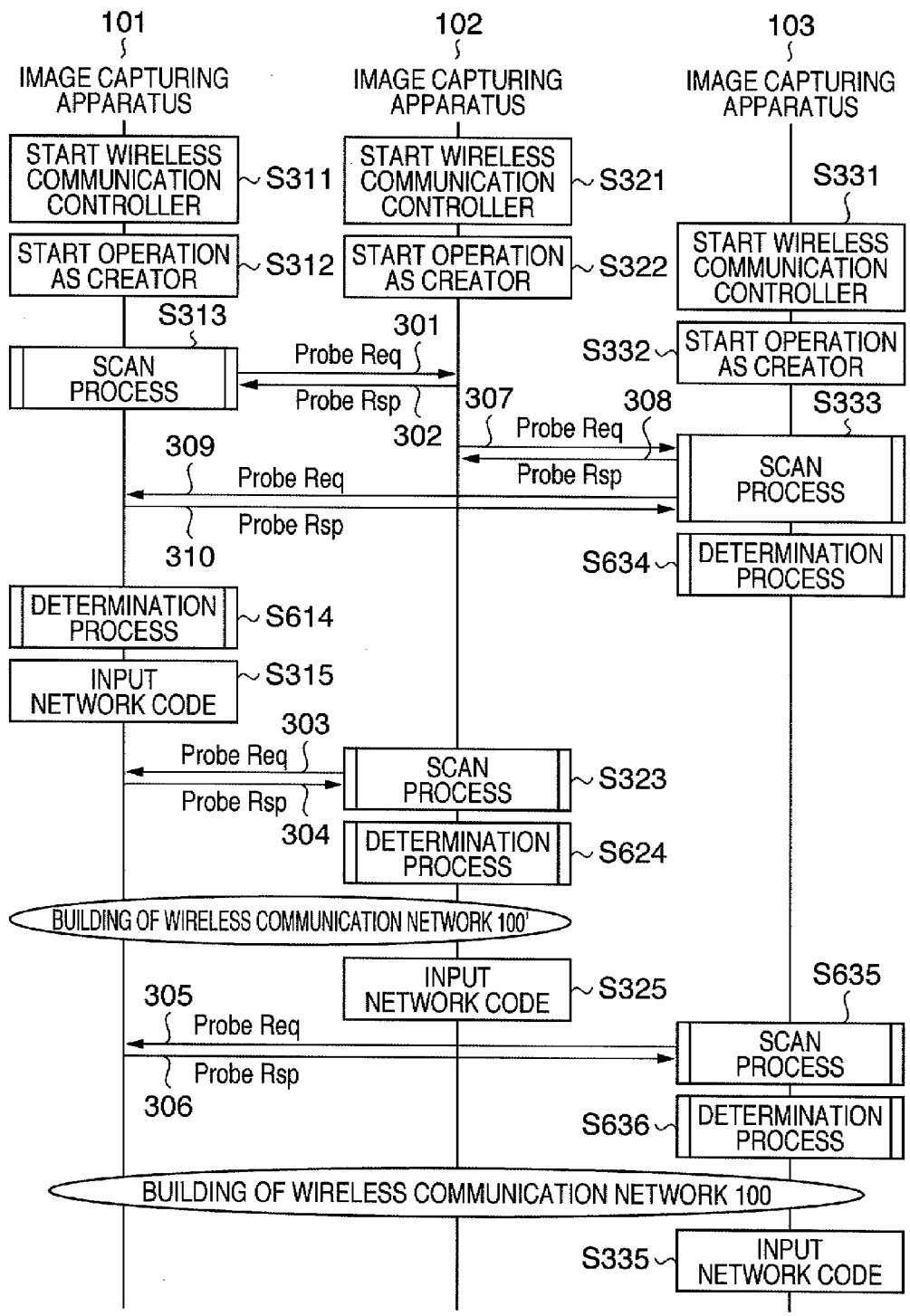
FIG. 6 is a sequence chart showing processing in a wireless communication controller 212 of an image capturing apparatus 101, 102 or 103 having a wireless communication function according to the second embodiment of the present invention.
Figure 7:
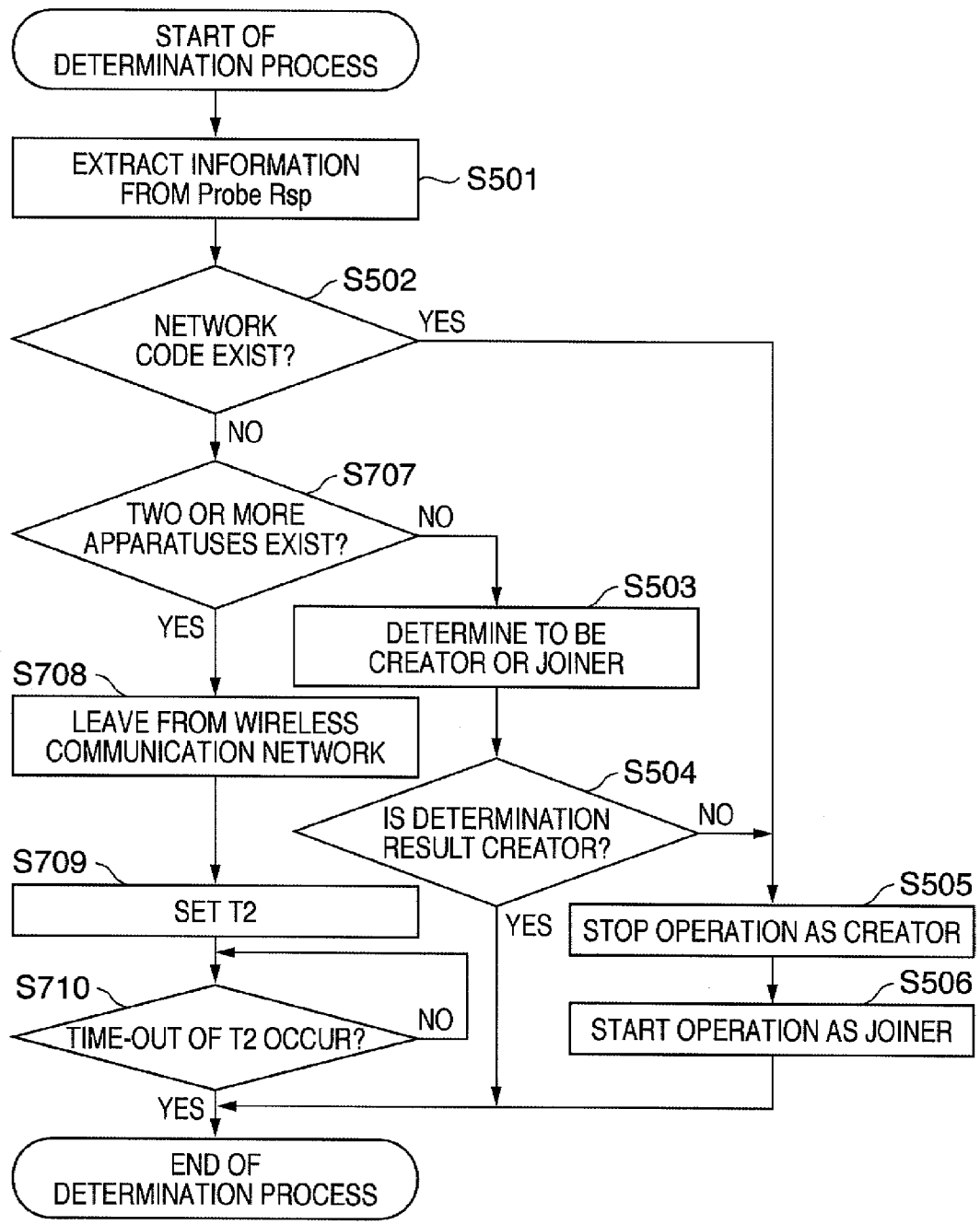
FIG. 7 is a flowchart showing the detailed sequence of a determination process in the sequence chart of FIG. 6.

FIG. 6 is a sequence chart showing processing in a wireless communication controller 212 of each of the image capturing apparatuses 101 to 103. FIG. 7 is a flowchart showing details of a determination process in the sequence chart (FIG. 6).

In the sequence chart shown in FIG. 6, a processing sequence between the image capturing apparatuses 101 and 102 until a wireless communication network is built is basically the same as that between the image capturing apparatuses 101 and 102 shown in the sequence chart of FIG. 3.

As for the image capturing apparatus 103, the processing is basically the same as that in FIG. 3 until the image capturing apparatus 103 starts the wireless communication controller 212 in step S331, starts operation as a creator in step S332, and executes a scan process in step S333.

In the scan process (step S333), however, a wireless communication network 100' is not built between the image capturing apparatuses 101 and 102 when the image capturing apparatus 103 transmits probe requests 307 and 309. Both of the image capturing apparatuses 101 and 102 are operating as creators.

The image capturing apparatuses 102 and 101 return probe responses 308 and 310 in response to the probe requests 307 and 309 transmitted from the image capturing apparatus 103, respectively.

Consequently, the image capturing apparatus 103 receives the two probe responses 308 and 310.

When the image capturing apparatus 103 receives the two probe responses 308 and 310 in the scan process (step S333), the image capturing apparatus 103 executes the determination process in step S634.

FIG. 7 is a flowchart showing the processing sequence of the determination process (step S634). The determination process shown in FIG. 7 is common to steps S614, S624, and S634 executed by the image capturing apparatuses 101 to 103 respectively. The determination process (step S634) of the image capturing apparatus 103 will mainly be described here.

In step S501, the image capturing apparatus 103 acquires BSSID, Time Stamp, and Capability Information of the image capturing apparatuses 101 and 102 from the probe responses 310 and 308 respectively.

It is determined in step S502 whether a network code is input to each of the received probe responses 308 and 310. If it is determined in step S502 that the network code is not input, it is determined that the wireless communication network 100' is not built, and the process advances to step S707.

It is determined in step S707 whether there exist two or more image capturing apparatuses each of which has transmitted a probe response to the image capturing apparatus 103. It is determined in step S707 that there are not two or more image capturing apparatuses, the image capturing apparatus 103 performs the processing in steps S503 to S506. The processing has been described with reference to FIG. 5, and a description thereof will be omitted (in case of the determination process by the image capturing apparatus 101 or 102 (step S614 or S624), the processing will be executed).

If it is determined in step S707 that there exist two or more apparatuses, the process advances to step S708 and the image capturing apparatus leaves a wireless communication network. When the image capturing apparatus 103 leaves the wireless communication network in step S708, even if the image capturing apparatus 103 is operating as a creator, the image capturing apparatus 103 does not respond to the probe requests from other image capturing apparatuses, and does not transmit the probe responses.

The image capturing apparatus 103 sets a wait timer T2 in step S709 so as to wait until a wireless communication network is built by other image capturing apparatuses. The image capturing apparatus 103 waits for a time-out of the wait timer T2 in step S710.

When the time-out of the wait timer T2 occurs and it is determined that the time T2 has elapsed in step S710, the determination process ends.

If it is determined in step S502 that the network code has been input, it is determined that a wireless communication network has been built, and the process advances to step S505. In step S505, the image capturing apparatus 103 stops the operation as a creator. Furthermore, in step S506, the image capturing apparatus 103 starts operation as a joiner to participate in the wireless communication network already built.

In this embodiment, as shown in FIG. 6, when the wireless communication controller 212 of the image capturing apparatus 103 starts, the wireless communication network 100' is not built between the image capturing apparatuses 101 and 102 and the image capturing apparatuses 101 and 102 operate as creators.

When the image capturing apparatus 103 executes the scan process (step S333), the image capturing apparatus 103 receives the probe responses 308 and 310 from the image capturing apparatuses 102 and 101, respectively. The network code is not input to the Vender Specific Information Element of each of the received probe responses 308 and 310.

It is determined in step S502 that the network code does not exist and in step S707 that there are two or more image capturing apparatuses. The processes in steps S708, S709, and S710 are executed.

The time-out of the wait timer T2 occurs in step S710 and the determination process ends. The process advances to step S635 and the image capturing apparatus 103 executes the scan process again (retransmission and rereception processes).

When the image capturing apparatus 103 transmits a probe request 305, the image capturing apparatus 101 operating as a creator returns a probe response 306 and the image capturing apparatus 103 receives the probe response 306.

At this time, since the image capturing apparatus 101 has already input the network code in step S315, the network code has been input to the received probe response 306.

When the determination process starts in step S636, it is therefore determined in step S502 of FIG. 7 that the network code exists and the image capturing apparatus 103 recognizes that the wireless communication network 100' has already been built. To participate in the built wireless communication network 100', the image capturing apparatus 103 stops the operation as a creator in step S505, and starts operation as a joiner in step S506.

As a result, the wireless communication network 100 is built between the image capturing apparatuses 101 to 103. The image capturing apparatus 103 inputs the network code in step S335 after starting the operation as a joiner.

As is apparent from the above explanation, in this embodiment, if three image capturing apparatuses start at the same time, until two of the image capturing apparatuses build a wireless communication network, the remaining one image capturing apparatus is in a waiting state. Consequently, it is possible to appropriately build a wireless communication network.

[Third Embodiment]

In the above first and second embodiments, a case in which a wireless communication network is built between three image capturing apparatuses has been described. In fact, however, it can be assumed that four or more image capturing apparatuses exist. In accordance with the positions and radio wave conditions of the image capturing apparatuses, wireless communication may not be implemented between all the image capturing apparatuses and a plurality of wireless communication networks built between the image capturing apparatuses may exist.

This embodiment will describe a method by which when a plurality of wireless communication networks are built between a plurality of image capturing apparatuses, the plurality of wireless communication networks are integrated into one network.

<1. Configuration of Wireless Communication Network>

Figure 8:
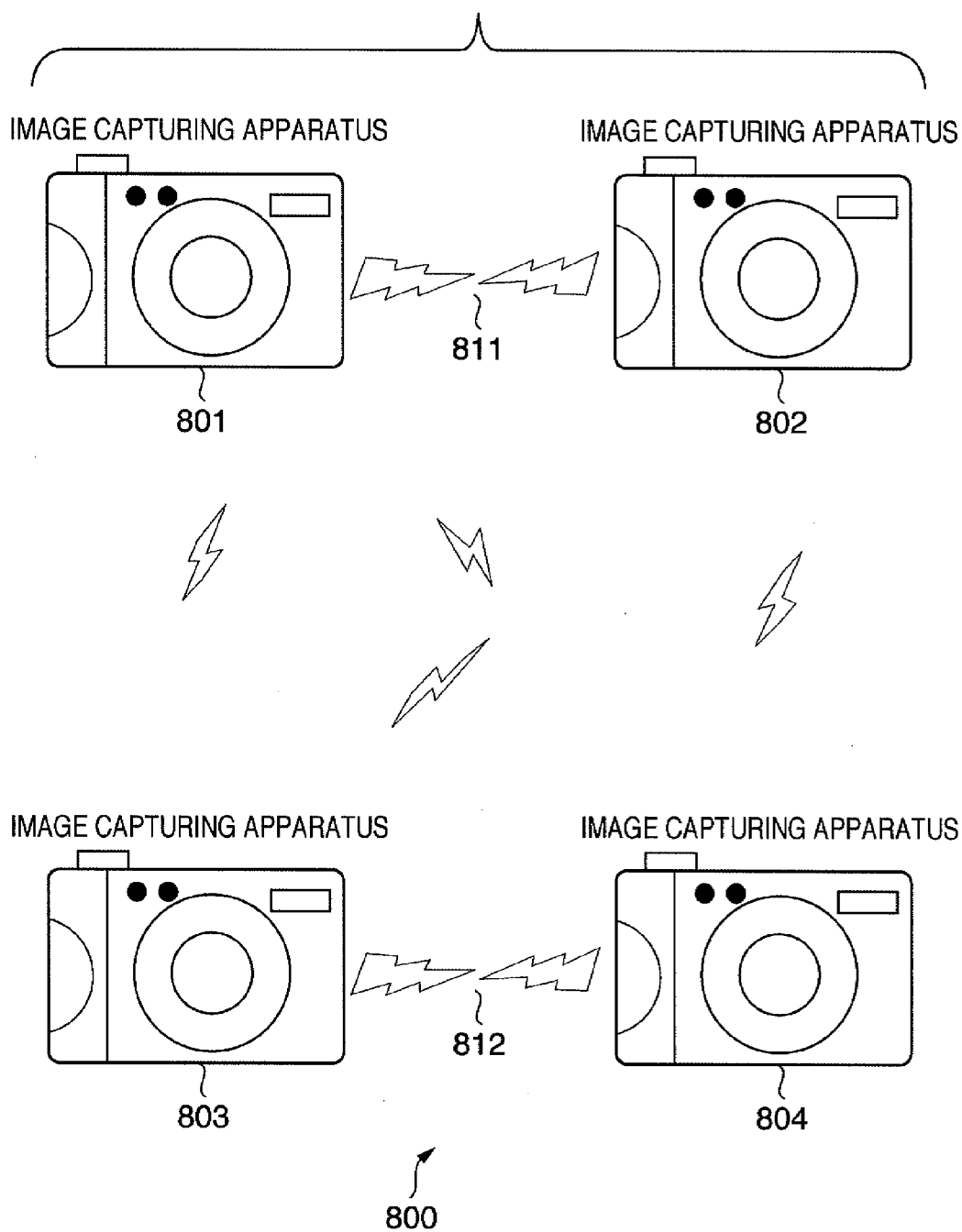
FIG. 8 is a view showing a wireless communication network 800 including image capturing apparatuses 801 to 804 each having a wireless communication function according to the third embodiment of the present invention.

FIG. 8 is a view showing the configuration of a wireless communication network 800 which is built by image capturing apparatuses each having a wireless communication function according to the third embodiment of the present invention. As shown in FIG. 8, assume that the wireless communication network 800 is made up from image capturing apparatuses 801 to 804.

To build the wireless communication network 800, assume that a wireless communication network 811 has been already built by executing the processing shown in FIG. 3 between the image capturing apparatuses 801 and 802. Similarly, assume also that a different wireless communication network 812 from the wireless communication network 811 has been already built by executing the processing shown in FIG. 3 between the image capturing apparatuses 803 and 804. When the wireless communication networks are built so that the image capturing apparatuses 801 to 804 are grouped into the wireless communication networks 811 and 812 each including two of the image capturing apparatuses, communication cannot be done among all the image capturing apparatuses. With the following processing, the single wireless communication network 800 is built.

<2. Processing sequence for Building Wireless Communication Network>

A processing sequence for integrating the wireless communication networks 811 and 812 into the single wireless communication network 800 will be described using FIGS. 9 to 11.

FIG. 9 is a sequence chart showing processing in a wireless communication controller 212 of each of the image capturing apparatuses 801 to 804 to integrate the wireless communication networks 811 and 812 into the single wireless communication network 800. FIGS. 10 and 11 are flowcharts respectively showing details of re-scan and re-determination processes in the sequence chart (FIG. 9).

The wireless communication networks 811 and 812 have been built. Under the circumstance, each of the image capturing apparatuses 801 to 804 starts a rescan process (step S911, S921, S931, or S941).

Figure 10:
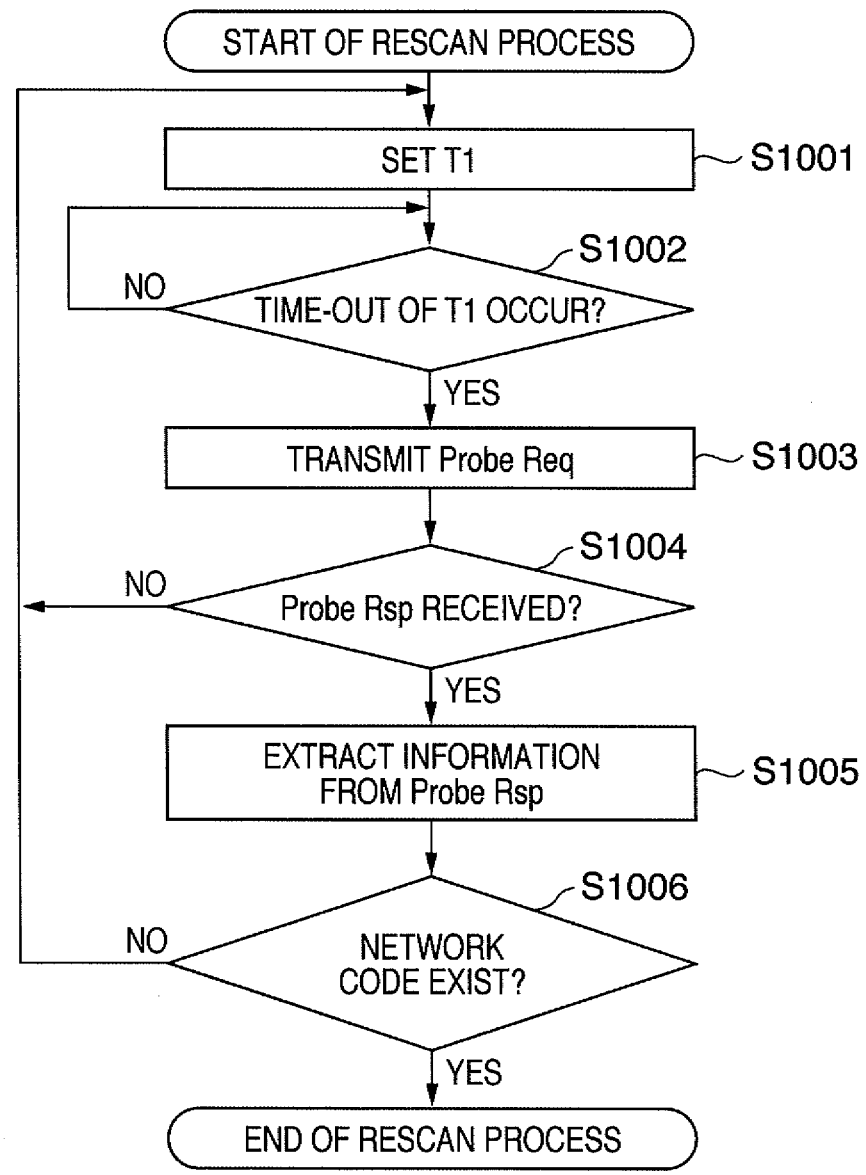
FIG. 10 is a flowchart showing the detailed sequence of a rescan process in the sequence chart of FIG. 9.

FIG. 10 is a flowchart showing a processing sequence of the re-scan process (step S911, S921, S931, or S941) in detail. The re-scan processes executed by the image capturing apparatuses 801 to 804 are the same. The re-scan process (step S911) in the image capturing apparatus 801 will mainly be described here.

In step S1001, the image capturing apparatus 801 sets a probe request random timer T1. In step S1002, the image capturing apparatus 801 waits for a time-out of the random timer T1. When the time-out of the random timer T1 occurs in step S1002, the process advances to step S1003. In step S1003, the image capturing apparatus 801 transmits a probe request 901.

When the image capturing apparatus 801 transmits the probe request 901, the image capturing apparatus 803 in the wireless communication network 812 returns a probe response 902. In this embodiment, assume that when the wireless communication network 812 is built, the image capturing apparatus 803 operates as a creator and the image capturing apparatus 804 operates as a joiner. The image capturing apparatus 803 therefore transmits the probe response 902.

The image capturing apparatus 802 in the wireless communication network 811 also transmits a probe response 904.

It is determined in step S1004 whether a probe response is received. If it is determined in step S1004 that the probe response cannot be received, the process returns to step S1001 and the above processing is repeated.

If it is determined in step S1004 that the probe response is received, the process advances to step S1005. In the rescan process (step S911) by the image capturing apparatus 801, the probe responses 902 and 904 are received. The image capturing apparatus 801 acquires BSSID, Time Stamp, and Capability Information of each of the image capturing apparatuses 802 and 803 in step S1005.

It is determined in step S1006 whether a network code is input to each of the received probe responses 902 and 904. If it is determined in step S1006 that the network code is not input, it is determined that another wireless communication network is not built. The process returns to step S1001 to repeat the above processing. If it is determined in step S1006 that another wireless communication network is built, the rescan process ends.

Since the network code is input to each of the probe responses 902 and 904 received by the image capturing apparatus 801, it is determined that the wireless communication network is built and the re-scan process ends.

Referring back to FIG. 9, when the rescan process (step S911) is complete, the process advances to step S912 to execute the re-determination process based on the received probe responses 902 and 904.

Figure 11:
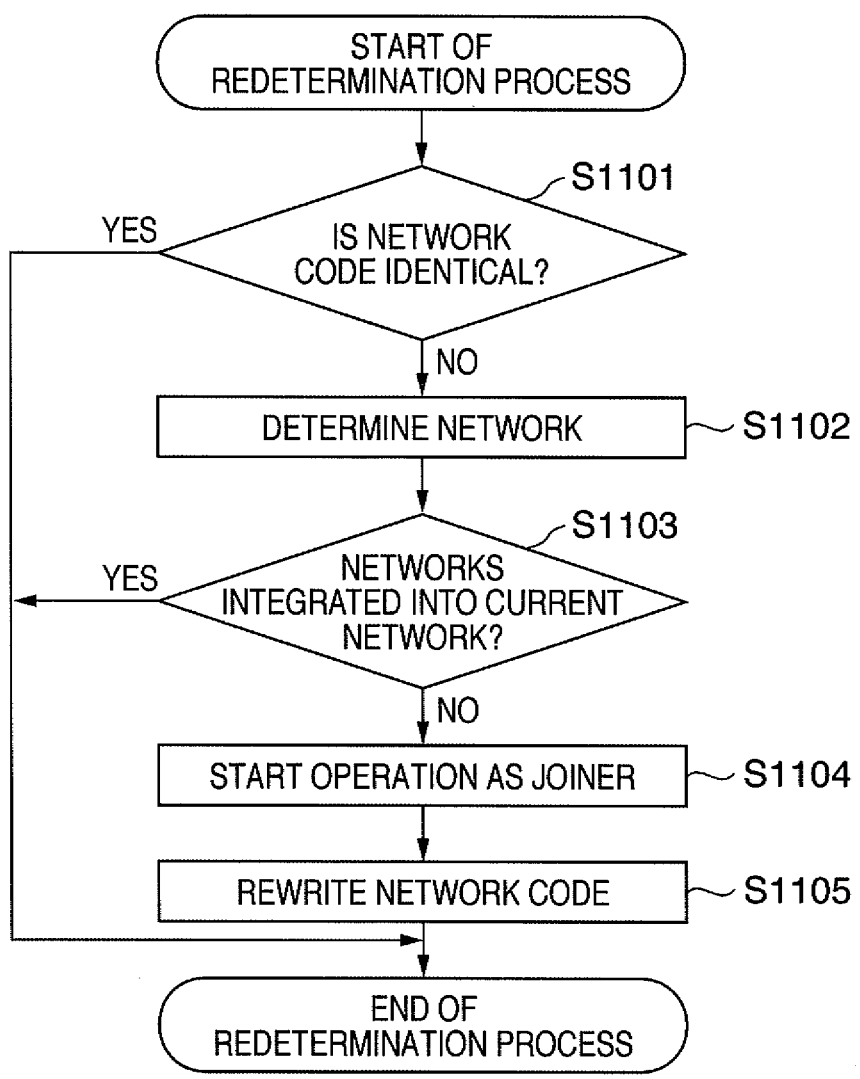
FIG. 11 is a flowchart showing the detailed sequence of a re-determination process in the sequence chart of FIG. 9.

FIG. 11 is a flowchart showing the detailed sequence of the re-determination process. Although the re-determination process (step S912) by the image capturing apparatus 801 will be described here, a similar process is executed in the re-determination process (step S922, S932, or S942) by each of the image capturing apparatuses 802 to 804.

It is determined in step S1101 whether each of the network codes input to the received probe responses 902 and 904 is identical to that input in the image capturing apparatus 801.

In this embodiment, the probe response 904 transmitted from the image capturing apparatus 802 contains the same network code as that input in the image capturing apparatus 801. The probe response 902 transmitted from the image capturing apparatus 803 contains the different network code from that input in the image capturing apparatus 801.

If it is determined in step S1101 that the same network is input, it is determined that the image capturing apparatus 802 belongs to the same wireless communication network 811 as that to which the image capturing apparatus 801 belongs and the re-determination process ends.

If it is determined in step S1101 that the network code is different, it is determined that a different wireless communication network from the wireless communication network 811 to which the image capturing apparatus 801 belongs is built and the process advances to step S1102.

It is determined in step S1102 which one of the wireless communication networks 811 and 812 is integrated into the other.

As the determination method in step S1102, for example, time information is added to each network code and one of the wireless communication networks is integrated into the other network with the earlier time.

Alternatively, the sum of MAC addresses of the image capturing apparatuses 801 and 802 is added to the network code of the wireless communication network 811. The sum of MAC addresses of the image capturing apparatuses 803 and 804 is added to the network code of the wireless communication network 812. These sums of the MAC addresses are then compared and one of the wireless communication networks is integrated into the other network with the larger sum, or vice versa.

Furthermore, a method may be used, by which it is only recognized that the wireless communication networks having the different network codes are built and pieces of information contained in the probe responses are compared. The information contained in the probe response includes BSSID, Time Stamp, Beacon Interval, and Capability Information.

It may be determined which one of the wireless communication networks is integrated into the other by comparing pieces of information other than the above information in the same way.

It is determined in step S1103 whether the wireless communication networks are integrated into the wireless communication network 811 built by the image capturing apparatus 801. If it is determined in step S1103 that the wireless communication networks are integrated into the wireless communication network 811, the re-determination process ends.

If it is not determined in step S1103 that the wireless communication networks are integrated into the wireless communication network 811, the process advances to step S1104. The image capturing apparatus 801 stops the operation as a creator, and starts operation as a joiner. In this way, the image capturing apparatus 801 participates in the wireless communication network 812. In step S1105, the image capturing apparatus 801 overwrites the input network code to the network code corresponding to the wireless communication network 812.

In this embodiment, assume that it is determined in step S1102 that the wireless communication networks should be integrated into the wireless communication network 811. The image capturing apparatus 801 therefore determines "Yes" in step S1103, and ends the re-determination process. Similarly, the image capturing apparatus 802 determines "Yes" in step S1103, and ends the re-determination process.

The image capturing apparatus 803 or 804 determines "No" in step S1103 of the re-determination process (step S932 or S942). Each of the image capturing apparatuses 803 and 804 stops the operation as a creator, and starts operation as a joiner in step S1104. In step S1105, each of the image capturing apparatuses 803 and 804 overwrites the input network code to the network code of the wireless communication network 811.

Consequently, the image capturing apparatus 803 participates in the wireless communication network 811 and the wireless communication network 800' is built. After that, the image capturing apparatus 804 participates in the wireless communication network 800' and the wireless communication network 800 is built.

When the image capturing apparatus 803 participates in the wireless communication network 811, the image capturing apparatus 804 belonging to the wireless communication network 812 may participate in the wireless communication network 800' by informing the image capturing apparatus 804 that the image capturing apparatus 803 participates in the wireless communication network 811.

As is apparent from the above explanation, according to the embodiment, even if a plurality of wireless communication networks are built, it is possible to rebuild an integrated wireless communication network.

[Other Embodiments]

The present invention may be applied to a system including a plurality of devices (e.g., a host computer, interface device, reader, and printer) or an apparatus (e.g., a copying machine, or facsimile apparatus) formed by a single device.

The objects of the present invention are also achieved by supplying a recording medium which records a program code of a software program that can implement the functions of the above-mentioned embodiments to the system or apparatus. The above functions are implemented when a computer (or a CPU or MPU) of the system or apparatus reads out and executes the program code stored in the recording medium. In this case, the recording medium which records the program code constitutes the present invention.

As a recording medium for supplying the program code, a Floppy® disk, a hard disk, an optical disk, a magnetooptical disk, a CD-ROM, a CD-R, a magnetic tape, a nonvolatile memory card, a ROM, or the like can be used.

The functions of the above-described embodiments are implemented not only when the readout program code is executed by the computer but also when the OS (Operating System) running on the computer performs part or all of actual processing based on the instruction of the program code.

The functions of the above-described embodiments are also implemented after the program code read out from the recording medium is written in the memory of a function expansion board inserted into the computer or a function expansion unit connected to the computer. That is, the functions are implemented when the program code is written in the memory, and the CPU of the function expansion board or function expansion unit performs part or all of actual processing based on the instruction of the program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-142323 filed on May 29, 2007, which is hereby incorporated by reference herein in its entirety.

What is claimed is:

1. An image capture apparatus, comprising:
   an image capture unit;
   a first receiving unit configured to wirelessly receive first information, wherein the first information is used to determine that the image capture apparatus should operate as a first role for joining a created wireless communication network;

a second receiving unit configured to wirelessly receive second information wherein the second information is used to determine that the image capture apparatus should operate as a second role for creating a wireless communication network or as the first role; and a determining unit configured to determine that the image capture apparatus should operate as the first role in a case that the first receiving unit receives the first information and in a case that the image capture apparatus connects to a communication partner apparatus which transmitted the first information, and determine that the image capture apparatus should operate as the second role or as the first role in accordance with the second information in a case that the first receiving unit does not receive the first information and the second receiving unit receives the second information, wherein the image capture apparatus communicates an image captured by the image capture unit with a communication partner apparatus to which the capture apparatus connects by operating as the first role or the second role that are determined by the determining unit.

2. The image capture apparatus according to claim 1, further comprising:

a constructing unit configured to construct a wireless communication network with a communication partner apparatus based on an operation as the second role or an operation as the first role.

3. The image capture apparatus according to claim 1, wherein the determining unit determines whether the image capture apparatus should operate as the second role or the first role based on comparing the second information with a third information which has been set in the image capture apparatus, wherein the second information is information associated with a communication partner apparatus which transmitted the second information.

4. The image capture apparatus according to claim 3, wherein the determining unit compares the second information with the third information, and in a case that a value indicated by the second information is larger than a value indicated by the third information, the determining unit determines that the image capture apparatus should operate as the first role, and in a case that a value indicated by the third information is larger than a value indicated by the second information, the determining unit determines that the image capture apparatus should operate as the second role.

5. The image capture apparatus according to claim 1, wherein in a case that the image capture apparatus operates as the second role, a network identifier for a wireless communication network to be constructed is set, and in a case that the image capture apparatus operates as the first role, the image capture apparatus joins a wireless communication network which is identified by a network identifier set by the communication partner apparatus.

6. The image capture apparatus according to claim 1, further comprising:

a response unit configured to respond to a search request from another apparatus with information which is used to determine that the other apparatus should operate as the first role in a case that the determining unit determines that the image capture apparatus should operate as the second role.

7. The image capture apparatus according to claim 1, further comprising:

a processing unit configured to execute a process for causing another apparatus to join a first wireless communication network after the image capture apparatus constructs the first wireless communication network with the communication partner apparatus.

8. The image capture apparatus according to claim 1, wherein the first information is information for inputting to a Vender Specific Information Element of a response signal to a search signal which is transmitted for searching another apparatus.

9. The image capture apparatus according to claim 1, wherein the first information and the second information is included in a response signal to a search signal transmitted for searching another apparatus.

10. The image capture apparatus according to claim 9, further comprising a setting unit configured to, if the image capture apparatus operates as the first role, set the first information received by the first receiving unit to the image capture apparatus.

11. The image capture apparatus according to claim 1, wherein if the first receiving unit receives the first information from the communication partner apparatus, the image capture apparatus operates as the first role without the determination based on the second information.

12. The image capture apparatus according to claim 1, wherein the first receiving unit receives the first information and the second receiving unit receives the second information by a communication conformed to IEEE 802.11 standard.

13. The image capture apparatus according to claim 1, wherein if the image capture apparatus operates as the second role, BSSID of a wireless communication network to be constructed is set to the image capture apparatus.

14. The image capture apparatus according to claim 1, wherein the first role is a role as a joining apparatus and the second role is a role as a constructing apparatus.

15. The image capture apparatus according to claim 1, wherein the image capture apparatus starts wireless communication processing including a determining processing by the determination unit in a case of receiving an instruction from a user.

16. The image capture apparatus according to claim 1, wherein the image capture apparatus displays a result of a wireless communication processing.

17. The image capture apparatus according to claim 1, wherein the image capture apparatus starts wireless communication processing including a determining processing by the determination unit in a case of receiving an instruction from a user, and displays a result of the wireless communication processing.

18. A control method for a image capture apparatus, comprising:

receiving wirelessly first information, wherein the first information is used to determine that the image capture apparatus should operate as a first role for joining a created wireless communication network;

receiving wirelessly second information wherein the second information is used to determine that the image capture apparatus should operate a second role for creating a wireless communication network or as the first role;

determining that the image capture apparatus should operate as the first role in a case that the first information is received and in a case that the image capture apparatus connects to a communication partner apparatus which transmitted the first information, and determining that the image capture apparatus should operate as the second role or as the first role in accordance with the second information in a case that the first information is not received and the second information is received; and communicating a captured image with a communication partner apparatus to which the capture apparatus connects by operating as the first role or the second role that are determined in the determining.

19. A non-transitory computer-readable medium encoded with a computer readable control program which, when executed by a processor, will cause a computer to execute the control method according to claim 18.

* * * * *